United States Patent
Lindenberger

(10) Patent No.: US 11,025,045 B2
(45) Date of Patent: Jun. 1, 2021

(54) INVERTER WITH INTERNAL/EXTERNAL FERROMAGNETIC CORES

(71) Applicant: VALEO SIEMENS EAUTOMOTIVE GERMANY GMBH, Erlangen (DE)

(72) Inventor: Heinz Lindenberger, Nuremberg (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 0 days.

(21) Appl. No.: 16/609,817

(22) PCT Filed: May 3, 2018

(86) PCT No.: PCT/EP2018/061299
§ 371 (c)(1),
(2) Date: Oct. 31, 2019

(87) PCT Pub. No.: WO2018/202749
PCT Pub. Date: Nov. 8, 2018

(65) Prior Publication Data
US 2020/0067298 A1 Feb. 27, 2020

(30) Foreign Application Priority Data

May 3, 2017 (DE) ...................... 10 2017 109 499.7

(51) Int. Cl.
*H02G 5/02* (2006.01)
*H01F 17/06* (2006.01)
(Continued)

(52) U.S. Cl.
CPC ............... *H02G 5/02* (2013.01); *H01F 17/06* (2013.01); *H02M 7/003* (2013.01); *H01F 2017/0093* (2013.01)

(58) Field of Classification Search
None
See application file for complete search history.

(56) References Cited

U.S. PATENT DOCUMENTS 3,477,051 A * 11/1969 Clark ..................... C25D 21/10
336/65
4,853,668 A * 8/1989 Bloom .................. H01F 27/255
336/214
(Continued)

FOREIGN PATENT DOCUMENTS

CN 204030937 * 12/2014
DE 3340494 A1 5/1985
(Continued)

OTHER PUBLICATIONS

KR101665317_English_Translation. KIPO. 2016. (Year: 2016).*
(Continued)

*Primary Examiner* — Timothy J. Dole
*Assistant Examiner* — Muhammed Azam
(74) *Attorney, Agent, or Firm* — Manabu Kanesaka

(57) ABSTRACT

An inverter having a first busbar for connection to a positive pole of a battery and a second busbar for connection to a negative pole of the battery and a filter element that includes an annular core surrounding the first and the second busbar and made from a ferromagnetic material. It is proposed that a core made from a further ferromagnetic material to be provided in an intermediate space surrounded by the annular core and formed between the two busbars.

12 Claims, 2 Drawing Sheets

(51) Int. Cl.
*H02M 7/00* (2006.01)
*H01F 17/00* (2006.01)

(56) References Cited

U.S. PATENT DOCUMENTS

| | | | | |
|---|---|---|---|---|
| 5,119,059 A * | 6/1992 | Covi | H01F 27/38 | 323/250 |
| 5,321,373 A * | 6/1994 | Shusterman | H03H 1/0007 | 333/12 |
| 5,731,666 A * | 3/1998 | Folker | H01F 3/12 | 315/276 |
| 5,781,091 A * | 7/1998 | Krone | H01F 17/0033 | 336/200 |
| 5,793,196 A * | 8/1998 | White | H01F 38/28 | 324/117 R |
| 5,793,272 A * | 8/1998 | Burghartz | H01F 17/0006 | 336/200 |
| 5,990,654 A * | 11/1999 | Skibinski | H02M 1/126 | 307/105 |
| 6,462,976 B1 * | 10/2002 | Olejniczak | H01L 23/48 | 257/E23.01 |
| 7,250,249 B2 * | 7/2007 | Yoshioka | G03C 1/49827 | 430/619 |
| 7,463,131 B1 * | 12/2008 | Hwang | H01F 17/0006 | 336/200 |
| 9,048,756 B2 * | 6/2015 | Dong | H02M 7/797 | |
| 9,276,390 B2 * | 3/2016 | Tanimizu | H01F 17/06 | |
| 9,622,384 B2 * | 4/2017 | Flet | B60L 58/16 | |
| 9,825,714 B1 * | 11/2017 | Braylovskiy | H01F 27/38 | |
| 10,024,312 B2 | 7/2018 | Okada et al. | | |
| 10,097,078 B2 * | 10/2018 | Rayner | H02M 7/5387 | |
| 10,404,040 B2 * | 9/2019 | Wurzinger | H02M 7/003 | |
| 10,491,109 B2 * | 11/2019 | Amaducci | H05K 1/18 | |
| 2002/0039667 A1 * | 4/2002 | Takaya | H01P 5/10 | 428/824 |
| 2002/0070831 A1 * | 6/2002 | Harding | H01F 17/0033 | 336/180 |
| 2002/0175571 A1 * | 11/2002 | Gilmore | H01F 17/062 | 310/45 |
| 2005/0030769 A1 * | 2/2005 | Sugisawa | H02M 7/003 | 363/39 |
| 2005/0280489 A1 * | 12/2005 | Talja | H01F 37/00 | 336/5 |
| 2007/0139151 A1 * | 6/2007 | Nussbaum | H01F 17/0013 | 336/200 |
| 2007/0252669 A1 * | 11/2007 | Hansen | H01F 27/255 | 336/212 |
| 2009/0140829 A1 * | 6/2009 | Sodo | H02M 1/126 | 336/5 |
| 2009/0160592 A1 * | 6/2009 | Hopper | H01F 17/04 | 336/83 |
| 2009/0179723 A1 * | 7/2009 | Ikriannikov | H01F 17/06 | 336/200 |
| 2009/0212640 A1 * | 8/2009 | Terorde | H02M 1/126 | 307/105 |
| 2009/0244943 A1 * | 10/2009 | Yamada | H02M 1/4225 | 363/126 |
| 2012/0139683 A1 * | 6/2012 | Salomaki | H01F 27/10 | 336/61 |
| 2013/0010504 A1 * | 1/2013 | Xiao | H01F 37/00 | 363/35 |
| 2013/0049918 A1 * | 2/2013 | Fu | H01F 3/12 | 336/220 |
| 2013/0187453 A1 * | 7/2013 | Flett | H05K 7/1432 | 307/23 |
| 2013/0214614 A1 * | 8/2013 | Krumme | H02J 50/10 | 307/104 |
| 2013/0242623 A1 * | 9/2013 | Wei | H02M 5/458 | 363/37 |
| 2014/0077735 A1 * | 3/2014 | Shinohara | B60L 50/16 | 318/400.21 |
| 2014/0285440 A1 * | 9/2014 | Stewart | G06F 3/0202 | 345/169 |
| 2014/0286054 A1 * | 9/2014 | Krause | H01F 3/12 | 363/16 |
| 2014/0286068 A1 * | 9/2014 | Allaert | H01F 30/06 | 363/131 |
| 2015/0069854 A1 * | 3/2015 | Kim | H02J 50/40 | 307/104 |
| 2015/0279552 A1 * | 10/2015 | Ginglseder | H01F 27/255 | 336/178 |
| 2015/0372655 A1 * | 12/2015 | Beck | H03H 1/0007 | 333/185 |
| 2016/0049236 A1 * | 2/2016 | Kneller | H01F 27/2895 | 336/178 |
| 2016/0065164 A1 * | 3/2016 | Meier | H01F 27/24 | 333/168 |
| 2016/0111971 A1 * | 4/2016 | Rayner | H02M 3/1584 | 307/52 |
| 2016/0117040 A1 * | 4/2016 | Kuo | G06F 3/044 | 345/174 |
| 2016/0126054 A1 * | 5/2016 | Friedemann | H01F 17/06 | 378/101 |
| 2016/0141953 A1 * | 5/2016 | Okada | F04C 23/008 | 417/415 |
| 2017/0178783 A1 * | 6/2017 | Lou | H01F 27/24 | |
| 2018/0167046 A1 * | 6/2018 | Schliewe | H01F 17/06 | |
| 2018/0241436 A1 * | 8/2018 | Kahlman | H04B 5/0093 | |
| 2019/0068029 A1 * | 2/2019 | Burger | H02K 11/02 | |
| 2019/0246493 A1 * | 8/2019 | Amaducci | H05K 1/0231 | |
| 2019/0371520 A1 * | 12/2019 | Pasko | H01F 27/2895 | |
| 2020/0014199 A1 * | 1/2020 | Gajanayake | H02H 9/023 | |

FOREIGN PATENT DOCUMENTS

| | | |
|---|---|---|
| DE | 102008031296 A1 | 8/2009 |
| DE | 102015119560 A1 | 5/2016 |
| KR | 101665317 B1 | 10/2016 |

OTHER PUBLICATIONS

Callister Jr. Fundamentals of Materials Science and Engineering, An Integrated Approach. 2009. Wiley. Third Edition, p. 732 (Year: 2009).*

Wikipedia (See References). Permeability (electromagnetism), published via Wayback Machine on Apr. 4, 2017. (Year: 2017).*

Marcel Dekker. Transformer-and-Inductor-Design-Handbook_Chapter_2. 2004. https://coefs.uncc.edu/mnoras/files/2013/03/Transformer-and-Inductor-Design-Handbook_Chapter_2.pdf (Year: 2004).*

DE33404941_English_Translation. (Year: 1985).*

Robles, "Advanced Power Inverter topologies". 2021. Renewable and Sustainable Energy Reviews. 140. (Year: 2021).*

Prabaharan. "A comprehensive review on reduced switch multilevel inverter". 2017. Renewable and Sustainable Energy Reviews. 76. 1248-1282 (Year: 2017).*

PCT/ISA/210, "International Search Report for International Application No. PCT/EP2018/061299," dated Aug. 21, 2018.

* cited by examiner

INVERTER WITH INTERNAL/EXTERNAL FERROMAGNETIC CORES

RELATED APPLICATIONS

The present application is National Phase of International Application No. PCT/EP2018/061299 filed May 3, 2018, and claims priority from German Application No. 10 2017 109 499.7, filed May 3, 2017, the disclosure of which is hereby incorporated by reference herein in its entirety.

The invention relates to an inverter according to the preamble of patent claim 1.

Such an inverter is generally known.

A first and a second busbar are received in a housing surrounding the inverter. The first busbar is connected to a first terminal provided on the housing outer side in order to be connected to a positive pole of a battery, and to an input terminal of an intermediate circuit capacitor. The second busbar is connected to a second terminal provided on the housing outer side in order to be connected to a negative pole of the battery, and to a further terminal of the intermediate circuit capacitor. The intermediate circuit capacitor supplies a downstream power inverter with current.

High-frequency common-mode (CM) interference and differential-mode (DM) interference is generated during operation of the power inverter. Common-mode interference is able to be reduced inter alia by an annular core surrounding the first and the second busbar and made from a ferromagnetic material. Further filter assemblies are normally required in order to reduce differential-mode interference. The current structure for reducing common-mode and differential-mode interference is relatively complex. Apart from this, there is a requirement for an inverter with improved electromagnetic compatibility (EMC).

The object of the invention is to rectify the disadvantages according to the prior art. The intention is in particular to specify an inverter that is able to be manufactured as easily and inexpensively as possible. According to a further target of the invention, the intention is to improve the electromagnetic compatibility of the inverter.

This object is achieved by the features of patent claim 1. Expedient refinements of the invention become apparent from the features of the dependent patent claims.

According to the provisions of the invention, it is proposed for a core made from a further ferromagnetic material to be provided in an intermediate space surrounded by the annular core and formed between the two busbars. It thus becomes possible, in a surprisingly simple and inexpensive manner, to effectively reduce not only common-mode but also differential-mode interference on the busbars.

The term "inverter" within the meaning of the present invention is understood in general to mean a device by way of which DC current is able to be converted into AC current and/or AC current is able to be converted into DC current.

The term "busbar" is understood in general to mean an electrical conductor. The electrical conductor preferably has a rectangular cross section. Other cross-sectional shapes, for example circular, oval, square and the like are additionally also conceivable.

A "ferromagnetic material" within the meaning of the present invention is understood in general to mean a material in the case of which elementary magnets are able to be arranged in a stable manner. Within the meaning of the present invention, the term "ferromagnetic material" also covers a ferrimagnetic material according to this general definition.

By virtue of the provision, proposed according to the invention, of a core made from a further ferromagnetic material within the annular core, a settable inductance that counteracts differential-mode interference is formed. It is thus possible to achieve effective filtering of differential-mode interference within the installation space, provided for filtering common-mode interference, of the annular core. The filter proposed according to the invention is particularly compact.

A predefined first spacing is advantageously provided between the core and the respectively opposing inner side of the annular core. The inductance formed by the core is able to be set by way of the first spacing. The first spacing may be 0.5 to 4.0 mm, preferably 1.0 to 3.0 mm.

A second spacing is expediently provided between the core and the respectively adjacent busbars. The second spacing is selected such that a flow of current between the busbars is securely and reliably avoided.

The busbars may have recesses that point towards one another and that surround the core in sections. Such a recess may for example have a rectangular profile in a plan view onto the busbar. A particularly compact structure is able to be achieved by providing the proposed recesses.

According to a further advantageous refinement, the ferromagnetic and/or the further ferromagnetic material has a first relative permeability $\mu_{r1}>10^3$. The core is preferably held in the annular core by way of a holding device, wherein the holding device is formed from a material having a second relative permeability $\mu_{r2}<10$. The holding device may in particular be produced from a plastic, a casting compound or the like.

A toroidal core made from a nanocrystalline ferromagnetic material is advantageously used as annular core. In comparison with conventional ferrite materials, such a material is distinguished by a particularly high relative permeability, with a roughly twice as high saturation flux density (typically >1 Tesla) and a better effect in the high frequency range. The ferromagnetic or further ferromagnetic material may in particular be a ferrimagnetic material.

The annular core may have an oval or substantially rectangular pass-through surface. The pass-through surface is in particular matched to the cross-sectional surface area of the busbars that are guided through, in order to achieve a particularly compact structure.

Exemplary embodiments of the invention will be explained in more detail below with reference to the drawings. In the figures.

Figure 1:
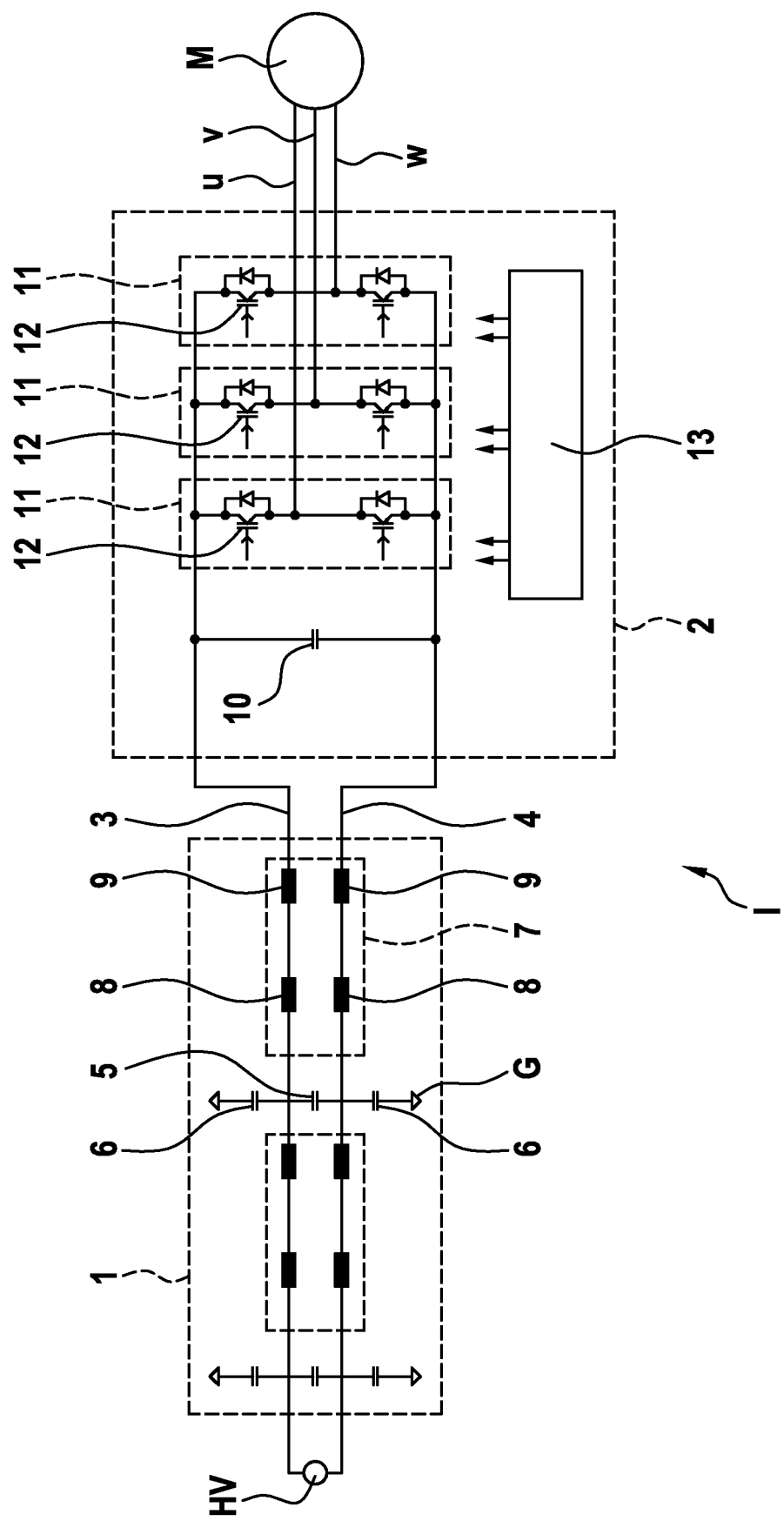
FIG. 1 shows a schematic circuit diagram of an inverter.

In FIG. 1, the reference sign HV denotes a battery and the reference sign M denotes a three-phase current motor. An inverter, generally denoted by the reference sign I, is connected between the battery HV and the three-phase current motor M. The inverter I comprises a filter stage 1 connected downstream of the battery HV and a power inverter 2 connected downstream of the filter stage 1 and whose outputs are connected to the three-phase current motor M.

The filter stage 1 has a multi-stage design in the present exemplary embodiment. It may also comprise just one stage.

A first busbar is denoted by the reference sign 3 and a second busbar is denoted by the reference sign 4. Each stage of the filter stage 1 may comprise an X-capacitor 5 connected between the first busbar 3 and the second busbar 4 and in each case a Y-capacitor 6 connected against the housing potential by the first busbar 3 and the second busbar 4.

The reference sign 7 generally denotes a filter element for reducing common-mode and differential-mode interference. The filter element 7 comprises an annular core choke 8 surrounding the first busbar 3 and the second busbar 4 and differential-mode chokes 9 formed by the core (not shown here).

The first busbar 3 and the second busbar 4 are connected at output to an intermediate circuit capacitor 10. The reference sign 11 denotes half bridges connected downstream of the intermediate circuit capacitor 10 and that each comprise two power transistors 12. Power transistor groups consisting of a plurality of parallel-connected power transistors may also be provided instead of each of the power transistors 12. The half bridges 11 are driven by way of a controller 13 by way of pulse width-modulated signals, resulting in a three-phase current in the phases u, v and w for operating the three-phase current motor M.

Common-mode and differential-mode interference forms on the first busbar 3 and the second busbar 4 due to the high-frequency switching procedures during operation of the half bridges 11. In order to reduce such interference, according to the invention, the filter element 7 that is described in more detail in FIGS. 2 and 3 is provided, inter alia.

Figure 2:
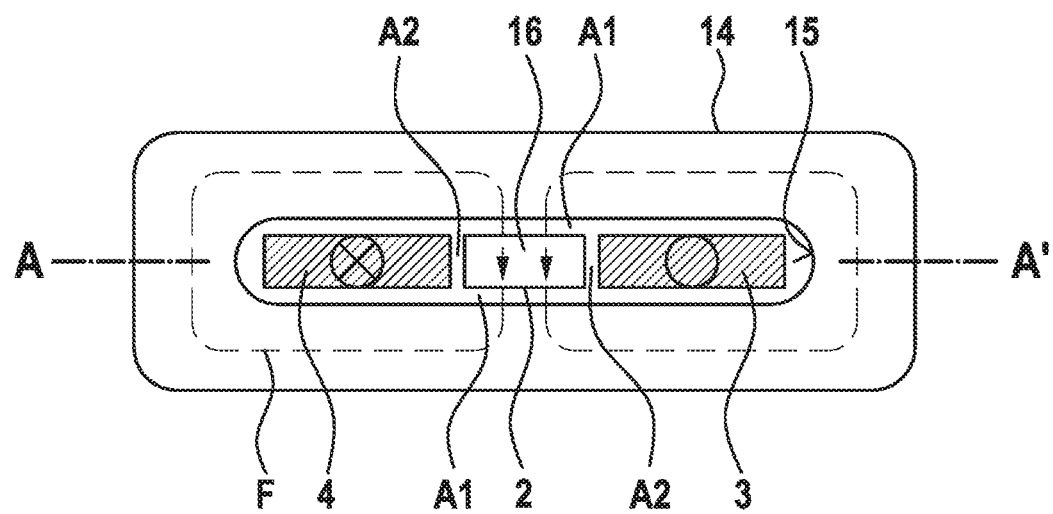
FIG. 2 shows a first sectional view through an annular core choke.
Figure 3:
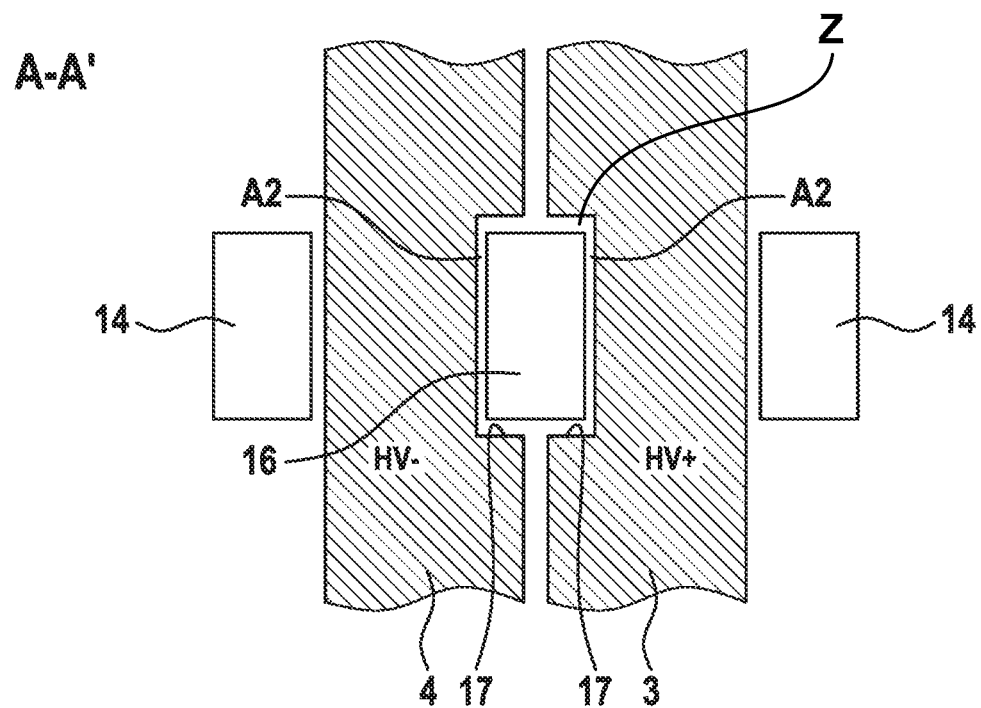
FIG. 3 shows a sectional view along the cutting line A-A' in FIG. 2.

In FIGS. 2 and 3, the reference sign 14 denotes an annular core manufactured from a ferromagnetic material. This may in particular in this case be a toroidal core made from a nanocrystalline ferromagnetic material. In particular in the case of toroidal cores, it is not readily possible to produce any desired geometries in terms of a pass-through surface 15 passing through the toroidal core due to the winding technology required for manufacturing purposes. That is to say, in the case of toroidal cores, the pass-through surface 15 usually has a circular, an oval or roughly rectangular shape.

The reference sign 16 denotes a core manufactured from a further ferromagnetic material and that is formed in an intermediate space Z between the first busbar 3 and the second busbar 4 and the opposing inner sides of the annular core 14. The core 16 has a first spacing A1 from the inner sides of the annular core 14. The reference sign A2 denotes a second spacing that is formed between the core 16 and the busbars 3, 4.

The function of the proposed filter element 7 is as follows:

The core 16, together with the annular core 14, forms a settable inductance that reduces differential-mode interference. The core 16 offers a magnetic path to flux lines F caused by differential-mode interference and thus makes it possible to generate a differential-mode inductance. The magnitude of this differential-mode inductance is able to be set by way of the first spacing 1.

Due to the dimensioning of the core 16 and the inductance generated thereby, the following is stated by way of example:

$$B=(L\ i)/A \text{ or } A=(L\ i)/B$$

wherein
B is the induction flux density,
L is the differential-mode inductance,
i is the current through the busbars and
A is the cross-sectional surface area of the core 16.

Assuming that $L=2\times100$ nH and $i=200$ A, a surface area $A=1$ cm$^2$ gives $B=0.4$ Tesla.

In order to achieve a particularly compact design, the first busbar 3 and the second busbar 4 may each have a recess 17. The recess 17 may for example have a rectangular form in plan view (see FIG. 3).

LIST OF REFERENCE SIGNS

1 Filter stage
2 Power inverter
3 First busbar
4 Second busbar
5 X-capacitor
6 Y-capacitor
7 Filter element
8 Annular core choke
9 Differential-mode chokes
10 Intermediate circuit capacitor
11 Half bridge
12 Power transistor
13 Controller
14 Annular core
15 Pass-through surface
16 Core
17 Recess
A1 First spacing
A2 Second spacing
F Flux line
HV Battery
I Inverter
M Three-phase current motor
u, v, w Phase
Z Intermediate space

The invention claimed is:

1. An inverter comprising:
    a first busbar connected to a positive pole of a battery;
    a second busbar separately formed and arranged apart from the first busbar, and connected to a negative pole of the battery; and
    a filter for reducing common-mode and differential-mode interference that includes an annular core surrounding the first and the second busbars and made from a ferromagnetic material,
    wherein another core made from a further ferromagnetic material is provided between the first and second busbars with a spacing in an intermediate space surrounded by the annular core and the first and second busbars, and
    the first and second busbars have recesses that point toward one another and that surround the another core in sections.

2. An inverter according to claim 1, wherein the spacing includes a predefined first spacing between the another core and each of inner sides of the annular core facing to each other.

3. An inverter according to claim 1, wherein the spacing includes a predefined second spacing between the another core and each side of the first and second busbars.

4. An inverter according to claim 1, wherein the annular core includes a pass-through surface having a substantial rectangle shape in which the first and second busbars and the another core are arranged, and
    the first and second busbars are spaced apart from each other and the recesses of the first and second busbars are recessed opposite to each other to form the intermediate space, and the another core is arranged apart from the pass-through surface and the first and second busbars through the spacing.

5. An inverter according to claim 1, wherein at least one of the ferromagnetic or and the further ferromagnetic material has a first relative permeability $\mu_{r1} > 10^3$.

6. An inverter according to claim 1, wherein the another core is held in the annular core by way of a holding device, wherein the holding device is formed from a material having a second relative permeability $\mu_{r2} < 10$.

7. An inverter according to claim 1, wherein a holding device is formed from a plastic.

8. An inverter according to claim 1, wherein the annular core is a toroidal core made from a nanocrystalline ferromagnetic material.

9. An inverter according to claim 1, wherein at least one of the ferromagnetic and the further ferromagnetic material is a ferrimagnetic material.

10. An inverter according to claim 1, wherein the annular core has a circular, oval or substantially rectangular pass-through surface.

11. An inverter according to claim 4, wherein an electric current flows from the positive pole of the battery through the first busbar in one direction and flows toward the negative pole of the battery through the second busbar in another direction opposite to the one direction.

12. An inverter according to claim 1, further comprising a power inverter connected to the filter at a downstream of the filter, and including an intermediate circuit capacitor having an input terminal to which the first busbar is connected, and an output terminal to which the second busbar is connected, and half bridges to which the first and second busbars are connected at a downstream of the intermediate circuit capacitor, each of the half bridges including two power transistors.

\* \* \* \* \*